United States Patent [19]
Rumpel

[11] Patent Number: 4,458,913
[45] Date of Patent: Jul. 10, 1984

[54] INDEPENDENT REAR WHEEL SUSPENSION

[75] Inventor: Manfred Rumpel, Birmingham, Mich.

[73] Assignee: Ford Motor Company, Dearborn, Mich.

[21] Appl. No.: 542,562

[22] Filed: Oct. 18, 1983

Related U.S. Application Data

[63] Continuation of Ser. No. 334,296, Dec. 24, 1981, abandoned.

[51] Int. Cl.³ .............................................. B60G 3/18
[52] U.S. Cl. .................................. 280/663; 280/670; 280/672; 280/698; 280/701
[58] Field of Search ............... 280/660, 663, 666, 667, 280/698, 670, 701, 672, 673, 675, 701, 702, 705, 711, 713, 724, 726; 267/66; 180/73.4, 73 R

[56] References Cited

U.S. PATENT DOCUMENTS

| | | | |
|---|---|---|---|
| 2,005,513 | 6/1935 | Weaver | 280/726 |
| 2,070,775 | 2/1937 | Bell | 280/666 |
| 2,171,157 | 8/1939 | Mathews | 280/660 |
| 2,179,856 | 11/1939 | Leighton | 29/149.5 |
| 2,305,820 | 12/1942 | Wagner | 280/666 |
| 2,842,230 | 7/1958 | MacPherson | 280/666 |
| 2,967,066 | 1/1961 | Mueller | 280/666 |
| 3,024,040 | 3/1962 | Müller | 280/660 |
| 3,177,965 | 4/1965 | Dews | 180/73 R |
| 3,189,118 | 6/1965 | Arning | 180/73 R |
| 3,202,237 | 8/1965 | Dreisziger | 180/73 R |
| 3,573,882 | 4/1971 | Van Winsen | 180/73 R |
| 3,603,422 | 9/1971 | Cordiano | 180/73 R |
| 3,693,746 | 9/1972 | Yamamoto | 180/73.4 |
| 3,694,000 | 9/1972 | Van Winsen | 180/73 R |
| 3,759,542 | 9/1973 | Loffler | 180/73.4 |
| 3,893,701 | 7/1975 | Kroniger | 280/690 |
| 4,046,403 | 9/1977 | Yoshida | 280/701 |
| 4,245,853 | 1/1981 | Inoue et al. | 180/73.4 |
| 4,269,432 | 5/1981 | Inoue et al. | 180/73.4 |

FOREIGN PATENT DOCUMENTS

| | | |
|---|---|---|
| 1101181 | 11/1958 | Fed. Rep. of Germany . |
| 1141546 | 12/1962 | Fed. Rep. of Germany . |
| 2249913 | 4/1974 | Fed. Rep. of Germany . |
| 2543189 | 7/1977 | Fed. Rep. of Germany . |
| 2005171 | 3/1969 | France . |

OTHER PUBLICATIONS

Patent Abstracts of Japan, vol. 5, No. 119, (M-81)[791], Jul. 31, 1981.
Ford Motor Company 1981 Model Shop Manual for Escort/Lynx Automobile, pp. 14-32-1.

*Primary Examiner*—Robert R. Song
*Attorney, Agent, or Firm*—Jerome R. Drouillard; Roger L. May

[57] ABSTRACT

An independent rear wheel suspension for a motor vehicle having front wheel drive includes a telescopic strut rigidly mounted to a wheel support member and having its upper end pivotably mounted to the vehicle chassis. Two laterally extending control arms are pivotably connected at their outboard ends to the wheel support member and at their inboard ends to the vehicle chassis. The two control arms are longitudinally spaced apart and having a spring seat bracket pivotably mounted therebetween which seats a coil spring interposed between the bracket and the vehicle chassis. The spring seat is pivotable with respect to the control arms to allow the control arms to undergo jounce and rebound movement while maintaining the spring seat bracket in a near horizontal position. In addition, the spring seat bracket allows the control arms to control the toe angle of the rear wheel during recession of the rear wheel.

19 Claims, 9 Drawing Figures

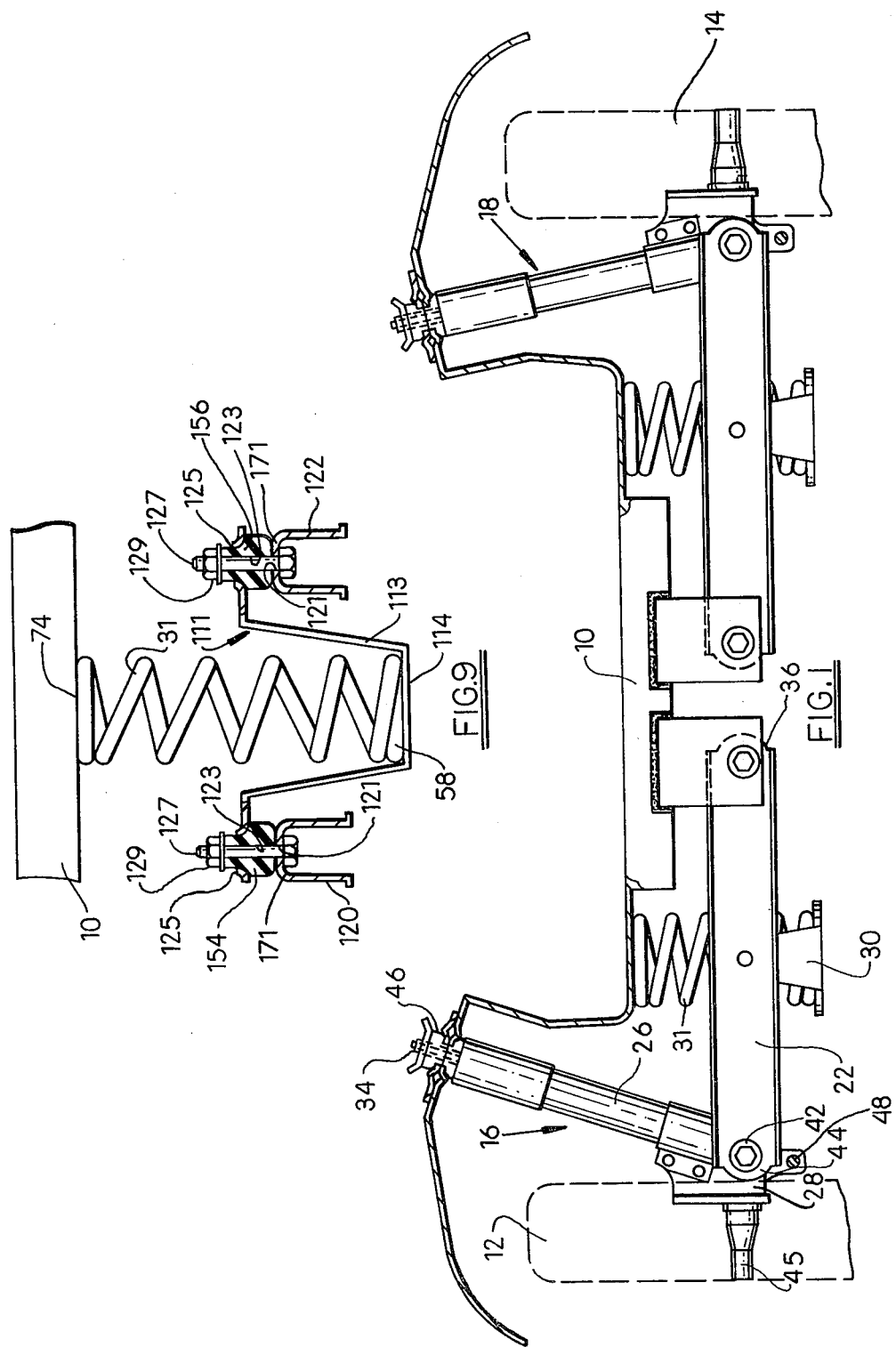

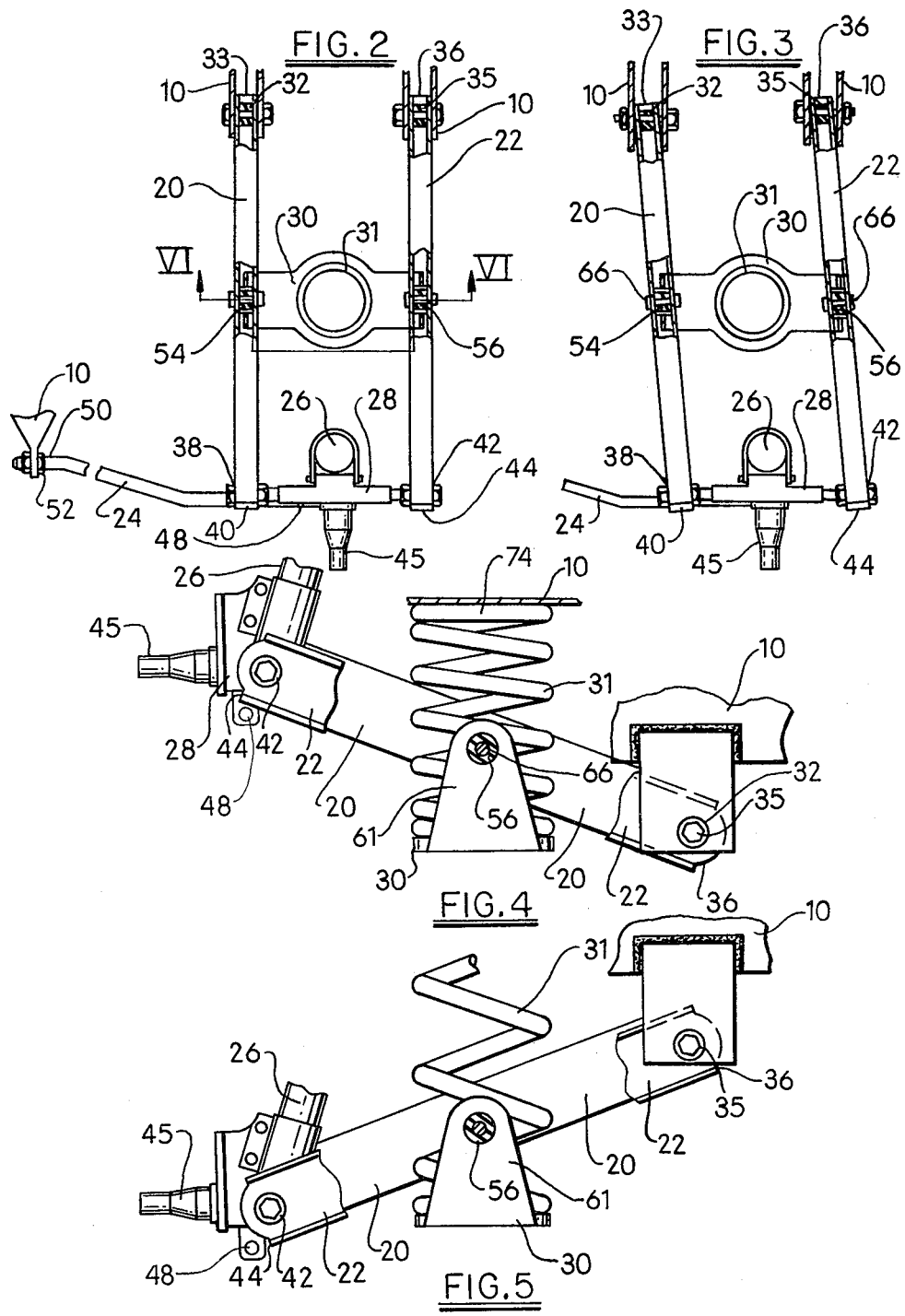

INDEPENDENT REAR WHEEL SUSPENSION

This application is a continuation of application Ser. No. 334,296, filed Dec. 24, 1981, now abandoned.

BACKGROUND OF THE INVENTION

1. Field of the Invention. This invention relates generally to independent wheel suspension systems for motor vehicles and more particularly to a strut type independent rear suspension for a front wheel drive vehicle.

2. Disclosure Information. Rear suspension systems have been constructed to control the attitude of the rear wheels in order to provide particular handling characteristics of the motor vehicle, for example roll understeer or roll oversteer, as well as to provide a soft ride free from road vibrations. Handling characteristics such as roll understeer, roll oversteer or roll neutral steer during cornering of a motor vehicle are achieved by controlling the toe angle of one of the rear wheels during the jounce stroke of the suspension.

A vibration free ride is enhanced if the rear wheels are allowed to recess when the wheel hits a bump. However, both wheel recession and steering stability must be taken into account when designing a rear suspension. One way to take both factors into account is by controlling the toe angle of the wheel during its recession.

One way to control the toe angle of a wheel is with a suspension having two control arms substantially transverse to the longitudinal axis of the vehicle. The arms control the toe angle changes of the wheels as they shift position.

However, previous usage of the two transverse control arms in combination with a strut suspension necessitated the spring element in the strut suspension to be mounted about the strut.

In many strut suspensions, the spring has been positioned away from the strut and interposed between a transverse control arm and the chassis so that the strut upper mount can be constructed from softer rubber, and secondly, valuable cargo space or engine compartment space can be maximized.

SUMMARY OF THE DISCLOSURE

In accordance with the present invention, an independent rear wheel suspension for a vehicle includes a chassis, a wheel support member, a telescopic shock absorbing strut rigidly secured at its lower end to the wheel support member and connected at its upper end to the chassis, and control arms pivotably connected to the chassis and the wheel support member. The control arms are longitudinally spaced from each other and substantially transverse to the longitudinal axis of the motor vehicle. A spring seat is pivotably mounted to both control arms and extends therebetween for seating a bottom end of a coil spring. The top end of the coil spring abuts the chassis of the motor vehicle.

It is desirable that the pivotable connection between the spring seat and each control arm includes rubber bushings that resiliently flex under side loads exerted thereon. It is also preferable that the spring seat pivots with respect to the control arms such that the spring seat remains in a substantially horizontal position when the control arms undergo large jounce and large rebound movement.

The broader aspects of the present invention are directed to a chassis, a wheel support member, and front and rear control arms which extend substantially transverse to the longitudinal axis of the chassis. The control arms are pivotably connected at their inboard ends and their outboard ends to the chassis and wheel support member, respectively. A spring seat is pivotably connected to at least one of the arms and seats a spring means interposed between the spring seat and the chassis.

A suspension according to the present invention provides for increased cargo or engine space. Secondly, the suspension isolates vibration between the control arms and the coil spring. Thirdly, it allows the use of softer rubber in the strut upper mount. Furthermore, it provides the above features in a suspension that can provide roll understeer, roll oversteer, or roll neutral steer, as well as wheel recession.

BRIEF DESCRIPTION OF THE DRAWINGS

Reference is now made to the accompanying drawings in which:

FIG. 1 is a rear elevational view, partly in section, of a motor vehicle incorporating independent rear wheel suspensions for its left and right rear wheels according to the invention;

FIG. 2 is a plan and partially segmented view of the left rear wheel suspension shown in FIG. 1;

FIG. 3 is a view similar to FIG. 2 showing the suspension during wheel recession;

FIG. 4 is an enlarged rear elevational and partially fragmented view of the rear wheel shown in FIG. 2 during jounce;

FIG. 5 is a view similar to FIG. 4 showing the suspension system during rebound;

FIG. 9 is a cross-sectional view similar to FIG. 6 of a fourth embodiment according to the invention.

DETAILED DESCRIPTION OF THE PREFERRED EMBODIMENTS

Figure 6:
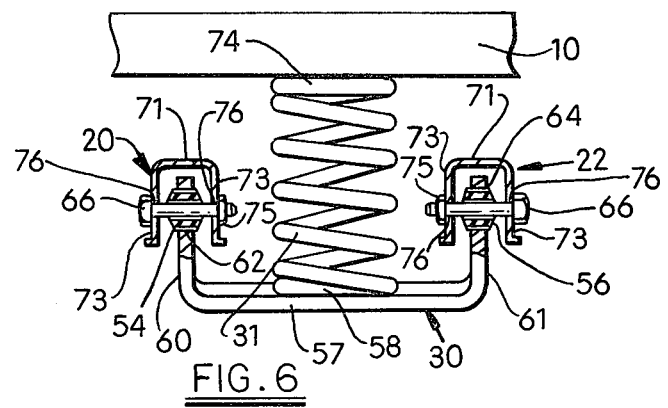
FIG. 6 is a cross-sectional view taken along the line VI—VI shown in FIG. 2.

Referring now to FIG. 1, a motor vehicle chassis (or unitized body and chassis) 10 is supported on left and right road wheels 12 and 14 by novel left and right independent wheel suspensions 16 and 18. Each wheel suspension 16 and 18 is identical except that one is a mirror image of the other; i.e., one is for the left side rather than for the right side. Since each independent suspension is the same, reference will only be made to the left wheel suspension 16.

Generally, as shown in FIGS. 1 and 2, the wheel suspension 16 includes a front transverse control arm 20, a rear transverse control arm 22, trailing arm 24, and a telescopic strut 26 which connects a wheel support member 28 to the motor vehicle chassis 10. Means are provided to pivotably connect the inner ends of the arms 20, 22 to the chassis 10 and their outer ends to the wheel support member 28, as will be described. A spring seat bracket 30 is pivotably mounted to both arms 20 and 22 and seats a coil spring 31 interposed between the seat 30 and chassis 10.

The front arm 20 has an elastomeric bushing 32 at its inboard end 33 which pivotably connects the arm 20 to the chassis 10. Similarly, the rear arm 22 has a similar bushing 35 at its inboard end 36 which pivotably connects the arm 22 to the chassis 10. An elastomeric bushing 38 pivotably connects the outboard end 40 of the front control arm 20 to the wheel support member 28. Similarly, a resilient bushing 42 pivotably connects outboard end 44 of the rear control arm 22 to the wheel support member 28.

The wheel support member 28 has an integral wheel spindle 45 which rotatably mounts wheel 12. The spindle 45 is positioned between the bushings 40 and 42. The wheel support member 28 is rigidly connected to the telescopic shock absorbing strut 26. The upper end 34 of the strut 26 is pivotably connected through a resilient upper mount 46 to the chassis 10.

The longitudinal trailing arm 24 is connected through an elastomeric bushing 48 to the wheel support member 28 and extends substantially forward therefrom. The arm 24 has its front end 50 resiliently connected through bushing 52 to the chassis 10.

Referring now to FIGS. 2, 4, and 6, the spring seat bracket 30 is pivotably connected through elastomeric bushings 54 and 56 to the front control arm 20 and rear control arm 22, respectively, at a mid-position between the inboard ends 33 and 36 and outboard ends 40 and 44 of the two arms 20 and 22. The spring seat bracket 30, as shown in FIG. 6, has a central seat 57 constructed to seat the lower end 58 of coil spring 31. The bracket 30 has two upwardly extending ends 60 and 61 which have apertures 62 and 64 therethrough which receive the elastomeric bushings 54 and 56 respectively. Each control arm 20 and 22 has a U-shaped cross-section with a top wall 71 and two depending side walls 73. The two side walls 73 are spaced apart to receive the ends 60 and 61 that house bushings 54 and 56. Bolts 66 pass through apertures 76 in the side walls 73 and through bushings 54 and 56 to pivotably connect bracket 30 to arms 20 and 22 respectively and are secured to the arms by nuts 75.

The top end 74 of coil spring 31 is seated against the chassis 10 so that the coil spring 31 normally exerts a downwardly biasing force on the spring seat bracket 30 and control arms 20 and 22 when the vehicle is at rest.

Referring now to FIG. 4, when the control arms 20 and 22 undergo jounce movement, the arms 20 and 22 pivot upwardly about the inboard bushings 32 and 35. As the arms 20 and 22 pivot upwardly, the spring seat bracket 30 is moved upward with the arms 20 and 22 to compress coil spring 31. In addition, the spring seat bracket 30 pivots about bushings 54 and 56 to remain in a near horizontal position.

Similarly, as shown in FIG. 5, when the control arms 20 and 22 undergo rebound movement and pivot downwardly about inboard bushings 32 and 35, the bracket 30 pivots about bushings 54 and 56 to maintain its near horizontal position as it moves downwardly and allows coil spring 31 to elongate.

Arms 20 and 22 and the other suspension components may be arranged to provide an increase in toe-in during jounce of wheel 12. Alternatively, no toe angle change during jounce of the wheel 12 or a toe-out of the wheel 12 may be desired during jounce. One skilled in the art can provide the appropriate geometry of the various suspension arms that will provide the desired toe angle dynamics during jounce.

The plurality of resilient bushings in the suspension system allow the road wheel to recess when subjected to a longitudinal force such as occurs when the wheel strikes a road obstacle (e.g., a tar strip in concrete pavement). As shown in FIG. 3, the control arms 20 and 22 control the toe angle of the rear wheel 12 during recession of the wheel. Arms 20 and 22 and the other suspension components may be arranged to provide no toe change during recession of the wheel. Alternatively, the arms 20 and 22 may be arranged to provide toe-in as the wheel undergoes recession. The elastomeric bushings 54 and 56 that mount the spring bracket 30 to the control arms are resilient to allow the spring seat bracket 30 to pivot with respect to the control arms 20 and 22 about vertical axes when the rear wheel 12 undergoes recession. When the wheel 12 regains its normal position, as shown in FIG. 2, the spring seat bracket 30 under the biasing influence of elastomeric bushings 54 and 56 pivots back to its initial position.

In other words, the spring seat bracket does not interfere with the vertical or horizontal movement of the control arms. Thusly, the spring bracket does not interfere with the toe angle of wheel 12 controlled by the control arms 20 and 22 during roll of the vehicle or recession of the wheel.

Another advantage provided for in the suspension 16 is the interposition of bushing 54 and 56 between the spring 31 and the control arms 20 and 22. The bushings 54 and 56 can absorb small high frequency vibrations which may otherwise pass from the control arms to the spring 31 and up to the chassis 10. As also shown in the figures, the position of the spring near the control arms rather than about strut 26 provides for increased cargo or engine space since the clearance about strut 26 can be minimized.

Furthermore, because the spring loads arms 20 and 22 and not mount 46, softer rubber can be used in upper mount 46 than would otherwise be feasible. The force of spring 31 is directed to both arms 20 and 22 in equal amounts. The arms, by being connected to the wheel support member 28 on opposite sides of the spindle 45, produce virtually no torque on the wheel support member. The even distribution of the spring force on the wheel support member promotes a vibration free ride.

Figure 7:
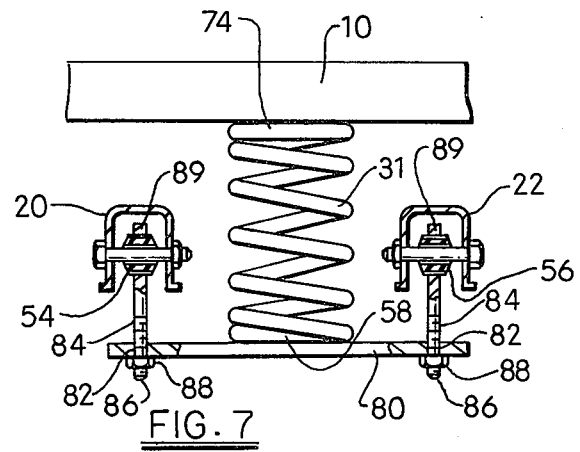
FIG. 7 is a cross-sectional view similar to FIG. 6 of a second embodiment according to the invention.
Figure 8:
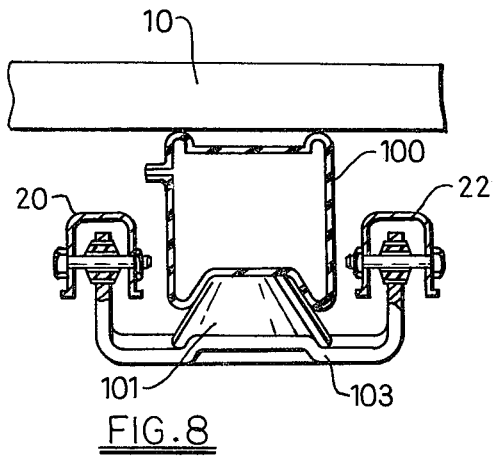
FIG. 8 is a cross-sectional view similar to FIG. 6 of a third embodiment according to the invention.

Reference now will be made to FIGS. 7-9 which disclose a second, third, and fourth embodiment. To simplify the discussion, parts that are identical to parts described in the first embodiment are referred to with the same numeral.

The second embodiment, shown in FIG. 7, has a central spring seat plate 80 which seats the lower end 58 of coil spring 31. The spring seat plate 80 has two apertures 82 near each end thereof which receive vertically extending supports 84 having threaded lower ends 86. The threaded ends 86 are secured to the plate 80 by nuts 88. The top end 89 of each support 84 is adapted to receive the bushings 54 and 56 which are pivotably mounted to the control arms 20 and 22 in the same fashion as the first embodiment.

The third embodiment shown in FIG. 8 has an air spring 100 interposed between the chassis 10 and an air spring piston 101 that is secured onto the bracket 103. The bracket 103 is secured to the control arms 20 and 22 in the same fashion as the first embodiment.

The fourth embodiment shown in FIG. 9 has a spring seat bracket 111 that has a downwardly extending central basket portion 113. The basket portion 113 has at its bottom end a spring seat 114 which seats the coil spring 31. The outer ends of the bracket 111 are seated on two elastomeric bushings 154 and 156 which in turn sit on the top wall 171 of each control arm 120 and 122. The top wall 171 of each control arm 120 and 122, each bushing 154 and 156, and each end of bracket 111 have apertures 121, 123 and 125 therethrough respectively which are aligned with each other to receive bolts 127. Bolts 127 have nuts 129 fastened thereto to secure the bracket 111 to the control arms 120 and 122 via bushings 154 and 156.

In this fashion, the suspension as described provides for increased cargo or engine space, a means of vibration isolation between the control arms and the spring, allows softer rubber to be used in the strut upper mount, and can be constructed to provide roll understeer, roll oversteer, or roll neutral steer, as well as wheel recession.

Variations and modifications of the present invention are possible without departing from its spirit and scope as defined by the appended claims.

The embodiments in which an exclusive property or privilege is claimed are defined as follows:

1. An independent rear wheel suspension for a vehicle comprising:
   a chassis;
   a wheel support member for rotatably mounting a wheel;
   an upwardly extending telescopic shock absorber having its lower end rigidly secured to said wheel support member;
   means pivotably connecting the upper end of said shock absorber to said chassis;
   tranversely extending front and rear control arms pivotably connected at their inboard ends to said chassis and at their outboard ends to said wheel support member;
   a spring seat means seating a spring means interposed between said spring seat means and said chassis; and
   pivot means connecting said spring seat means to said control arms so as to allow said control arms to move relative to said spring seat about substantially vertical axes.

2. An independent rear wheel suspension as defined in claim 1 further comprising:
   a longitudinal link having one end connected to said chassis and its other end connected to said wheel support member.

3. An independent rear suspension as defined in claim 1 wherein:
   said pivot means comprises bushing means which allows pivotable movement of said spring seat about a substantially longitudinally extending axis and resiliently resists pivotable movement of said spring seat about a vertical axis.

4. An independent rear wheel suspension as defined in claim 3 further comprising:
   a longitudinal link having one end connected to said chassis and its other end connected to said wheel support member.

5. An independent rear wheel suspension as defined in claim 1 wherein said wheel support member supports said wheel at a position longitudinally between where the outboard ends of said arms are connected to said wheel support member.

6. An independent rear wheel suspension for a vehicle comprising:
   a chassis;
   a wheel support member;
   transversely extending front and rear control arms pivotably connected at their inboard ends to said chassis and at their outboard ends to said wheel support member;
   a spring seat located between said front and rear control arms, said spring seat seating a spring interposed between said spring seat and said chassis; and
   pivot means connecting said spring seat means to said control arms so as to allow movement of said control arms relative to said spring seat about substantially vertical axes.

7. An independent rear wheel suspension as defined in claim 6 wherein:
   said pivot means comprises bushing means, each of which allows pivotable movement of said spring seat about a longitudinally extending axis and resiliently resists pivotable movement of said spring seat about a vertical axis.

8. An independent rear wheel suspension for a vehicle comprising:
   a chassis;
   a wheel support member;
   an upwardly extending telescopic shock absorber having its lower end rigidly secured to said wheel support member;
   means pivotably connecting the upper end of said shock absorber to said chassis;
   transversely extending front and rear control arms pivotably connected to their invoard ends of said chassis and at their outboard ends to said wheel support member;
   a spring seat located between said front and rear control arms, said spring seat comprising a piston member operably engaging an air spring interposed between said piston and said chassis; and
   pivot means connecting said spring seat means to said control arms so as to allow movement of said control arms relative to said spring seat about substantially vertical axes.

9. An independent rear wheel suspension for a vehicle comprising:
   a chassis;
   a wheel support member for rotatably mounting a wheel;
   an upwardly extending telescopic shock absorber having its lower end rigidly secured to said wheel support member;
   means pivotably connecting the upper end of said shock absorber to said chassis;
   transversely extending front and rear control arms pivotably connected at their inboard ends to said chassis and at their outboard ends to said wheel support member, said wheel support member being constructed to support said wheel at a position longitudinally between where the outboard ends of said arms are connected to said wheel support member;
   means for seating a spring and distributing the spring load onto both of said control arms; and
   pivot means connecting said spring seat means to said control arms so as to allow movement of said control arms relative to said spring seat about substantially vertical axes.

10. An independent rear wheel suspension for a vehicle comprising:
    a chassis;
    a wheel support member for rotatably mounting a wheel;
    transversely extending front and rear control arms pivotably connected at their inboard ends to said chassis and at their outboard ends to said wheel support member, said wheel support member being constructed to support said wheel at a position longitudinally between where the outboard ends of said arms are connected to said wheel support member;

means for seating a spring and distributing the spring load onto both of said controls arms; and pivot means comprising bushing means connecting said spring seat means to said control arms, said bushing means allowing pivotable movement of said spring seat about a longitudinally extending axis and resiliently resisting pivotable movement of said spring seat about a vertical axis while allowing rotational movement of said control arms in a horizontal plane.

11. An independent rear wheel suspension for a vehicle comprising:

a chassis;

a wheel support member and attached road wheel;

transversely extending front and rear control arms pivotably connected at their inboard ends to said chassis and at their outboard ends to said wheel support member;

a spring seat located between the outboard and inboard ends of said control arms; and pivot means attaching said spring seat to said control arms so as to allow said control arms to move relative to said spring seat about substantially vertical axes as said road wheel recesses.

12. An independent rear wheel suspension for a vehicle as defined in claim 11, wherein said pivot means allow said control arms to rotate horizontally as said road wheel recesses.

13. The suspension as defined in claim 12, further comprising:

a longitudinal link having one end connected to said chassis and its other end connected to said wheel support member.

14. The suspension as defined in claim 12, further comprising:

an upwardly extending telescopic shock absorber having its lower end rigidly secured to said wheel support member.

15. The suspension as defined in claim 11, further comprising:

a longitudinal link having one end connected to said chassis and its other end connected to said wheel support member.

16. The suspension as defined in claim 11, further comprising:

an upwardly extending telescopic shock absorber having its lower end rigidly secured to said wheel support member.

17. An independent rear wheel suspension for a vehicle comprising:

a chassis;

a wheel support member;

an upwardly extending telescopic shock absorber having its lower end rigidly secured to said wheel support member;

means pivotably connecting the upper end of said shock absorber to said chassis;

tranversely extending front and rear control arms pivotably connected to their inboard ends to said chassis and at their outboard ends to said wheel support member; and a spring seat located between and pivotably connected to said front and rear arms by bushing means and seating a spring interposed between said spring seat and said chassis, said bushing means being constructed to allow pivotably movement of said spring seat about a substantially longitudinally extending axis and to resiliently resist pivotable movement of said spring seat about a vertical axis.

18. An independent rear suspension as defined in claim 17, further comprising:

a longitudinal link having one end connected to said chassis and its other end connected to said wheel support member.

19. An independent rear suspension for a vehicle comprising:

a chassis;

a wheel support member;

tranversely extending front and rear control arms pivotably connected at their inboard ends to said chassis and at their outboard ends to said wheel support member; and a spring seat located between and pivotably connected to said front and rear control arms by bushing means and seating a spring interposed between said spring seat and said chassis, said bushing means being constructed to allow pivotably movement of said spring seat about a longitudinally extending axis and to resiliently resist pivotable movement of said spring seat about a vertical axis.

* * * * *